United States Patent [19]

Guillaume

[11] Patent Number: 4,835,402

[45] Date of Patent: May 30, 1989

[54] METHOD FOR QUANTITATIVELY DETERMINING THE SHAPE OF SMALL SIZE PROTRUDING PATTERNS

[76] Inventor: Michel Guillaume, Chemin du Pré de l'Achard, 38330 Saint Nazaire Les Eymes, France

[21] Appl. No.: 131,487

[22] Filed: Dec. 10, 1987

[30] Foreign Application Priority Data

Dec. 10, 1986 [FR] France ............................ 86 17611

[51] Int. Cl.$^4$ ............................................. G01N 21/86
[52] U.S. Cl. ................................... 250/560; 356/382
[58] Field of Search ............... 250/560, 561, 201 AF, 250/201 PF; 356/382

[56] References Cited

U.S. PATENT DOCUMENTS

| 4,640,620 | 2/1987 | Schmidt | 356/376 |
| 4,677,302 | 6/1987 | Chiu et al. | 356/376 |
| 4,707,610 | 11/1987 | Lindow et al. | 356/376 |

FOREIGN PATENT DOCUMENTS

| 0035720 | 9/1981 | European Pat. Off. |
| 0133120 | 2/1985 | European Pat. Off. |
| 8312328 | 7/1983 | France |

OTHER PUBLICATIONS

"Optical Profile Transducer", Sawatari et al., Proceedings of the Society of Photo Optical Instrumentation Engineers 8/1978, pp. 8–13.

M. E. Guillaume "Fourier Transform Method for Optical Linewidth Measurement", SPIE vol. 80 (1984) pp. 71–77.

M. E. Guillaume, "Accurate Image Modeling for Submicron CD Optical Control." Microelectronic Engineering 6 (1987), pp. 631–636.

M. E. Guillaume, et al.: "Evaluation of a Fourier Transform Method for Accurate Critical Dimension Measurements," Microelectronic Engineering, vol. 3, No. ¼, Dec. 1985, pp. 211–218.

R. T. Gallagher: "IC Testing: A New Way to Measure Submicron Line Widths," Electronics, vol. 59, No. 8, Feb. 1986, pp. 22, 23.

Primary Examiner—David C. Nelms
Attorney, Agent, or Firm—Lowe, Price, LeBlanc, Becker & Shur

[57] ABSTRACT

A method for quantitatively determining the shape of a pattern in a layer formed on a substrate comprising several steps is disclosed. The method includes acquiring by means of an optical microscope an image i(X) of said object, the focussing being made at an arbitrary height, calculating through a Fourier transform the frequency spectrum I(X) corresponding to the image, calculating a model M(X) corresponding to an object having a width L, to an optical microscope having characteristic functions T(X) and P(X), and to parameters a and b characterizing the reflective power of the object with respect to the substrate according to the formula:

$$M(X) = b\,[T(X)\,\mathrm{sinc}\pi XL - a\,P(X)\,\cos\pi XL]$$

where: $\mathrm{sinc}\,Y = (\sin Y)/Y$. The method further includes using initially roughly estimated a, b and L values, calculating for each value of X: $D(X) = I(X) - M(X)$, calculating the summation E of D(X) on the range of the X values considered in the determination of the model, varying a, b and L for having E minimum, and selecting the corresponding L value, whereby the L value corresponding to the arbitrary height of the object onto which the focussing is made.

6 Claims, 2 Drawing Sheets

METHOD FOR QUANTITATIVELY DETERMINING THE SHAPE OF SMALL SIZE PROTRUDING PATTERNS

FIELD OF THE INVENTION

The invention relates to an optical method for determining the shape of very small size protruding patterns, having a size in the range of 1 micrometer or less.

BACKGROUND OF THE INVENTION

The invention is particularly useful in the field of microelectronics. Indeed, in this field, the manufacturing techniques such as photolitohography and etching are in rapid progress and patterns having a width smaller than 1 micrometer are obtained. Thus, when they study an integrated circuit, the designers define the acceptable margins for the patterns that are used for localizing the various functions. The size differences are generally due to not controlled variations of physical values that occur during the manufacturing. Tests are provided for detecting the manufacturing steps which are problematic and for quickly adjusting the machines causing such defects. However, such tests slow down the manufacturing and increase the cost thereof and it is important to avoid erroneous decisions which cause the disposal of correct circuits or the acceptation of deficient circuits. Therefore, the result of controls has to be correct and reliable.

The largest part of the systems for dimensional measurement operate on an enlarged image of the pattern to be measured. This image is provided through an optical or electronic microscope to which is associated an equipment specially provided for ensuring the measurement function.

The microscope constitutes the first stage of the measuring chain. It comprises an irradiating device, an object-carrying plate, and an imaging device.

The irradiation is obtained through an electron source in case of a scanning electron microscope (SEM) or through a light source (lamp or laser) in case of optical microscopy. Once irradiated, the various regions of the object either emit secondary electrons (SEM) or reflect a portion of the incident light. The interaction between the irradiation and the object depends locally on the nature and the arrangement of the considered materials. The resulting phenomenon is itself modified by the imaging device which collects the information for transmitting same to the second measuring stage: the acquisition device.

The information acquisition is carried out through a transformation of the optical (or electronic) space signal into an electrical signal that can be digitalized. This transformation of a space information into a time information is carried out by scanning. In a SEM, the object and the detector are fixed: it is the irradiation beam that moves with respect to the object. In conventional optical microscopy, the irradiation, the object and the image are fixed: it is the scanning device of the sensor that generates the wished signal.

The size that one wishes to determine is defined as the distance between the two mechanical edges of a line. Initially, the shape of the pattern is defined by its drawing on a mask. Its structure is basically two-dimensional and into a given direction.

On the contrary, the pattern obtained on an integrated circuit wafer necessitates a three-dimensional description. This pattern is characterized by the thickness of the materials and the shape of the edges. In particular, if the edges are not vertical, and this is the common case, it is necessary to precise the level to which corresponds the measured dimension.

Due to its high resolution factor, the SEM permits to measure the topography and can provide a measurement reference. Unfortunately, the operation is destructive. Indeed, it is necessary to cleave the sample perpendicularly to the direction of the line and to observe the cross section of the pattern. Additionally, in order to avoid phenomenons due to electrical charge accumulation in the material, the object has to be metallized. Moreover, for permitting the calibration of the microscope magnification, the pattern has to belong to a recurring structure, the pitch of which is easily measured. Such a measurement method is unpractical to implement. However, it is presently the only known method for providing precise measurements of objects having a very small size. The resolution limit of the SEM apparatuses is in the range of 0.5 to 50 nm while this limit is only between 300 to 1,000 nm for the optical systems.

In order to more efficiently utilize the resolution of the optical microscope systems, the French patent application No. 83/12328 of July 26, 1983 discloses a specific method wherein, instead of directly observing the image of a line, this image is transformed into the frequency field by discrete Fourier transform. However, this method finds reliable application only when the thickness of the object to be measured is smaller than the field depth of the optical microscope. In fact, it is not possible to implement measurements on layers having a thickness higher than about 0.8 micrometer.

Accordingly, for very small size structures, having a width lower than 1 micron, but a thickness in the range of 1 micron or more, for example a line having a width of 0.8 $\mu$m and a thickness of 1.2 $\mu$m, no reliable and non-destructive method of measuring the width of a line is presently available. Additionally, when one considers such a structure which has not a priori vertical edges, the size measurement has no real meaning but it is additionally necessary to carry out a shape determination.

SUMMARY OF THE INVENTION

One object of the invention is to provide a shape determination method for such a pattern having a non negligible thickness with respect to its width and with respect to the field depth of an optical system.

It will be understood that when a line width measurement is carried out, the exact position at which the measurement is carried out with respect to the height or thickness of the line is not known, because it is not possible to exactly determine the position of the focal plane with respect to the object. It is also an object of the instant invention to resolve this ambiguity.

For attaining this object and others, the instant invention provides for quantitatively determining the shape of a pattern in a layer formed on a substrate comprising the following steps:

acquiring by means of an optical microscope an image i(x) of said object and digitalizing same, the focusing being made at an arbitrary height with respect to the thickness of the object, calculating through a Fourier transform the frequency spectrum I(X) corresponding to the image, calculating a model M(X) corresponding to an object having a width L, to an optical microscope having characteristic functions T(X) and P(X), and to parameters a and b characterizing the reflective power of the object with respect to the substrate according to the formula:

$$M(X) = b[T(X) \sin c\pi XL - aP(X) \cos \pi XL]$$

where: $\sin cY = (\sin Y)/Y$ using initially roughly estimated a, b and L values,
  calculating for each value of X: $D(X) = I(X) - M(X)$,
  calculating the summation E of D(X) on the range of the X values considered in the determination of the model,
  varying a, b and L for having E minimum, and
  selecting the corresponding L value,
  whereby the L value corresponding to the arbitrary height of the subject onto which the focussing is made, is obtained.

Preferentially, the functions $\sin \pi XL$ and $\cos \pi XL$ constitute an orthonormed base of the model.

According to an embodiment of the invention, the transfer function T(X) is of the type $U(X, c) + d.V(X, e)$ and the function P(X) is deduced from the equation $$P(X) \propto \frac{1}{X} \int \frac{T(X + X', X')}{X'} dX'$$

where:
  c, d and e are variable parameters, the value of which is determined in order to minimize the variation between the observation and the model, and
  X' is an integration variable of the same nature as the spatial frequency X.

By this method one obtains a first measure of the width of a pattern but without knowing to which height position corresponds this measurement.

For solving this ambiguity, and quantitatively determining the shape of the pattern, the measurement is repeated during a vertical scanning for successive incremental moves of the microscope lens with respect to the measured object; for example, by moving first towards the object, then by moving apart from the object.

For each position, the minimum of the above noted E value is determined in order to provide the corresponding L value. Additionally, the minima among the minima of the value E indicate the characteristic positions for which the measurement is carried out at the levels where the measured object presents abrupt slope variations (apexes, bases . . . ).

BRIEF DESCRIPTION OF THE DRAWINGS

Those objects, features and advantages and others of the instant invention shall be disclosed in greater details in the following description taken in association with the attached drawings wherein.

DETAILED DESCRIPTION OF PREFERRED EMBODIMENTS

Figure 1:
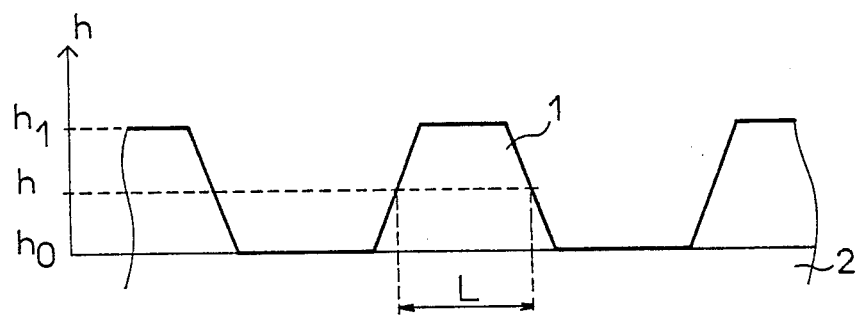
FIG. 1 shows an example of a structure, the shape of which is to be determined.

FIG. 1 shows an example of a pattern, the shape of which is to be determined according to the invention. It is for example a resist rib 1 formed on a substrate 2. This rib has a height larger than the field depth of the used microscope.

The measurement device comprises an optical microscope used in a clear background mode, providing an enlarged image of the pattern to be measured. This microscope is characterized by the fact that its lighting is always partially coherent because the light source is practically punctual. Additionally, the light source is characterized by an emission spectrum, the width of which is sufficiently large for having the parasitic interference effects which would be observed with a single frequency lighting to disappear. Preferentially, the bandwidth is close to 80 nm. Additionally, the central position of the emission band of this light source can be displaced in order to optimize the image contrast. The obtained image is received onto a photo-sensitive receptor providing a signal proportional to the received intensity. The receptor makes a spatial sampling of the image intensity distribution. This sampling respects the rules imposed by the Shannon theorem, that is, if p is the resolution limit of the optical system, the sampling step is smaller than p/2. The samples are then digitalized and the set of those samples constitutes the observed signal. This signal is treated by the Fourier transform method disclosed in the French patent application No. 83/12328 of July 26, 1983. It will be understood that, in the case of a pattern such as the one shown, the height of which (for example larger than 1 micron) is larger than the field depth of the used microscope, the value of the height h for which the focussing is carried out is ignored.

Figure 2:
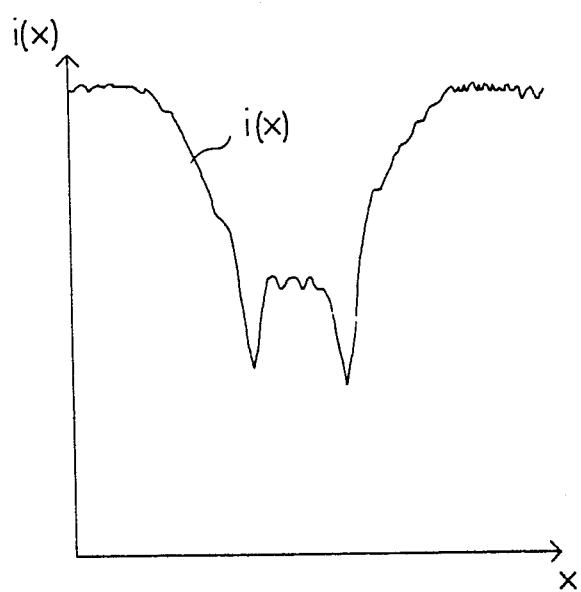
FIG. 2 shows the image of the structure of FIG. 1 as a light intensity pattern i(x)
Figure 3:
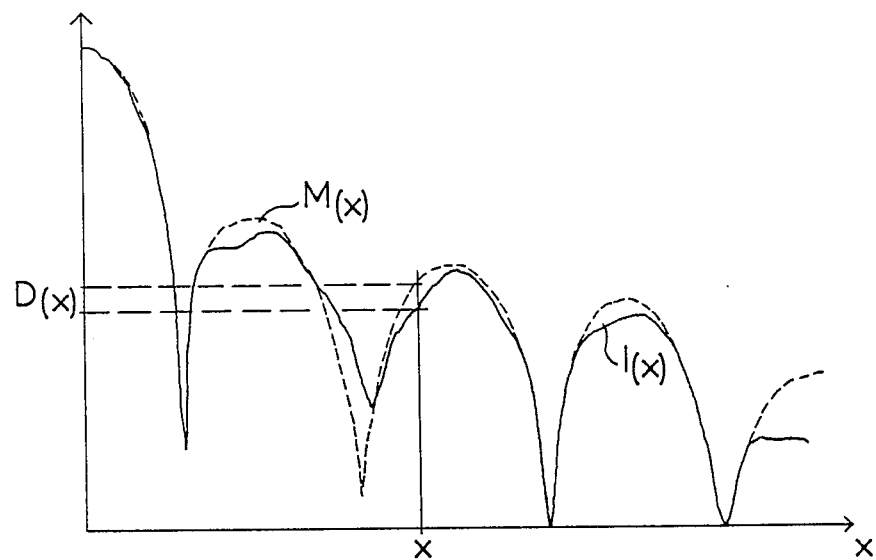
FIG. 3 illustrates with curves implementations steps of the invention.
Figure 4:
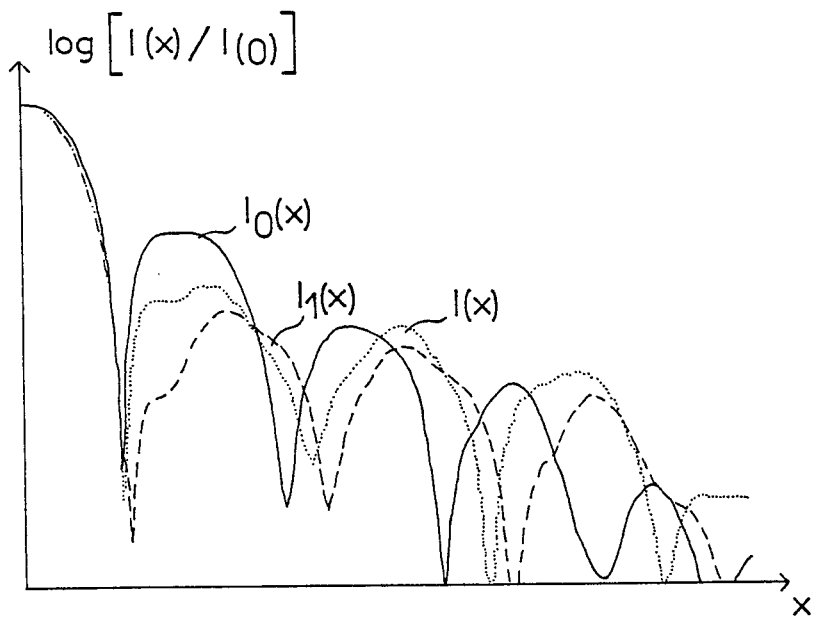
FIG. 4 illustrates the variation of the spectral shape for various focussing.

Thus, according to the invention, the image i(x) is acquired for some focussing of the microscope (FIG. 2) and the discrete Fourier transform is calculated and corresponds for example to the curve I(X) shown in solid lines in FIG. 3. In accordance with the method disclosed in the above patent application, it is eventually possible to deduct therefrom a first approximate value of the width for the carried out focussing. From either the width value measured by the classical method or from an a priori estimation of the width value, a function M(X) according to the above formula (1) is calculated by using the estimated value and a priori values of the parameters a, b, c, d, and e. It will be recalled that b is a normalization factor, a is a factor dependent upon the respective reflection parameters of the pattern 1 and the substrate 2, T(X) and P(X) are known functions associated to the optical microscope device. Then, for each value of X, the value $D(X) = I(X) - M(X)$ (refer to FIG. 3) is calculated and the summation E of D(X) on the range of the X values considered in the determination of the model is carried out. Then, the L value, arbitrarily chosen as the starting point for constructing the curve M(X), and the values a and b are made to vary and the value of L which causes a minimum E sum to be obtained is hold.

With this method, an accurate value of the width L corresponding to a height h is obtained. However, this result is valuable only if the pattern 1 is perfectly rectangular due to the fact that it is not possible to optically or mechanically determine at which height h the microscope has been focussed with respect to the plane of the substrate 2.

According to the invention, it has been found by the inventor that, when the microscope lens is displaced with respect to the observed object, by moving closer to the substrate 2, the value E obtained after optimization arrives to a minimum minimorum when h=0. It is thus possible to determine the instant at which the microscope is focussed at the level of the substrate 2. Then, by incrementally moving the microscope apart from the substrate 2, and by calculating the successive L values for each increment, it is possible to determine the shape of the pattern to be analyzed. Another minimum appears when the focussing is at the apex of the patterns. More generally, clear minima appear at the level of each change of the geometrical slope of the measured object.

For better understanding the implementation of the invention, FIG. 3 shows, in the case of the pattern of FIG. 1, values of the functions log $[I(x)/I(0)]$ and more precisely for $I0(x)$, $I(x)$ and $I1(X)$ corresponding to the heights h0, h and h1, respectively.

In the above, a displacement of the microscope has been indicated towards and apart from the substrate in case the pattern is protruding; the method also applies similarly in case the pattern is etched, the minimum minimorum corresponding to the level of the interface between the substrate and the layer in which is formed the pattern.

I claim:

1. A method for quantitatively determining the shape of a pattern in a layer formed on a substrate comprising the following steps:
   acquiring by means of an optical microscope an image $i(x)$ of said object and digitalizing same, the focussing being made at an arbitrary height with respect to the thickness of the object,
   calculating through a Fourier transform the frequency spectrum $I(X)$ corresponding to the image,
   calculating a model $M(X)$ corresponding to an object having a width L, to an optical microscope having characteristic functions $T(X)$ and $P(X)$, and to parameters a and b characterizing the reflective power of the object with respect to the substrate according to the formula: $M(X) = b[T(X) \sin c\pi XL - aP(X) \cos \pi XL]$
   where: $\sin cY = (\sin Y)/Y$ using initially roughly estimated a, b and L values,
   calculating for each value of X: $D(X) = I(X) - M(X)$,
   calculating the summation E of $D(X)$ on the range of the X values considered in the determination of the model,
   varying a, b and L for having E minimum and selecting the corresponding L value,
   whereby the L value corresponding to the arbitrary height of the object onto which the focussing is made, is obtained.

2. A method according to claim 1 wherein the model $M(X)$ is formed on an orthonormed base, sin $\pi XL$ and cos $\pi XL$.

3. A method according to claim 1 wherein the transfer function $T(X)$ is of the type $U(X, c) + d \cdot V(X, e)$ and the function $P(X)$ is deduced from the equation:

$$PX = \frac{1}{X} \int \frac{T(X + X', X')}{X'} dX'$$

where:
   c, d and e are variable parameters, the value of which is determined in order to minimize the variation between the observation and the model, and
   $X'$ is an integration variable of the same nature as the spatial frequency X.

4. A method according to claim 1 wherein the electronic microscope comprises a light source having an emission spectrum, the width of which is sufficient for having the parasitic interference effects, which should be obtained with a single wavelength lighting, to disappear.

5. A method according to claim 4 wherein the central position of the emissive band of the light source can be displaced in order to optimize the image contrast.

6. A method of quantitatively determining the shape of a pattern of a substrate according to claim 1, further comprising the following steps:
   varying the microscope-substrate distance,
   for each distance, implementing the method according to claim 1,
   determining the region where the substrate and the pattern are flush when the value of the obtained summation E is a minimum, and
   incrementally moving the microscope apart from the interface substrate/pattern for determining the value L for successive distances and quantitatively deducing therefrom the pattern shape.

* * * * *